(12) United States Patent
Matsuura (10) Patent No.: US 6,184,875 B1
(45) Date of Patent: Feb. 6, 2001

(54) DISPLAY APPARATUS

(75) Inventor: Makoto Matsuura, Chigasaki (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/190,096

(22) Filed: Nov. 12, 1998

(30) Foreign Application Priority Data

Nov. 14, 1997 (JP) .................................................. 9-313629

(51) Int. Cl.[7] .................................................. G09G 5/00
(52) U.S. Cl. .......................................... 345/211; 345/102
(58) Field of Search ............................. 345/87, 211, 212, 345/213, 102; 348/730

(56) References Cited

U.S. PATENT DOCUMENTS

| | | | |
|---|---|---|---|
| 5,313,225 | * 5/1994 | Miyadera | 345/102 |
| 6,005,559 | * 12/1999 | Miyamoto | 345/212 |
| 6,020,879 | * 2/2000 | Nakabayashi | 345/212 |
| 6,078,302 | * 6/2000 | Suzuki | 345/102 |

OTHER PUBLICATIONS

U.S. application No. 08/466,750, filed June 6, 1995.*
U.S. application No. 08/655,893, filed May 31, 1996.*

* cited by examiner

*Primary Examiner*—Regina Liang
(74) *Attorney, Agent, or Firm*—Fitzpatrick, Cella, Harper & Scinto (57) ABSTRACT

A display apparatus includes a CPU, an image display device, a light source for irradiating the image display device, a circuit for turning on/off the light source, a means for determining the resolution of the input image signal, a first switching means for turning on/off the power supply to the circuit components except the light source turning on/off circuit and a second switching means for turning on/off the power supply to the light source turning on/off circuit. In a first power-saving mode, the circuits may be opened by means of the first switching means after an appropriately selectable first predetermined period of time and may be opened by means of the second switching means after an appropriately selectable second predetermined period of time. A second power-saving mode is also provided for opening the first and second switching means by a combination of the polarity of the input horizontal synchronizing signal and that of the input vertical synchronizing signal. The first power-saving mode and the second power-saving mode may be used selectively.

6 Claims, 6 Drawing Sheets

DISPLAY APPARATUS

BACKGROUND OF THE INVENTION

1. Field of the Invention

This invention relates to a display apparatus designed to operate in a power-saving fashion that is adapted to the input image signal.

2. Related Background Art

Known power-saving techniques for display apparatus include DPMS (Display Power Management Signaling) of the VESA (Video Electronics Standard Association). In projectors using image display devices, the light source lamp is normally turned off if no input signal has been received for a certain period of time.

In some display apparatus for video cam coders, the image being displayed is blacked out if no keys have been operated for a certain period of time.

As a result of the recent development of multi-media communication systems, there is a strong demand for display apparatus having a large and bright display screen and compatible with various input signals including NTSC signals and other television signals as well as image signals from computers. Metal halide lamps having a high output power and high pressure mercury lamps are being popularly used for large and bright display screens. Although power is reliably saved by turning off the light source lamp, it takes a considerable time for such a lamp to restore the proper brightness after it is turned on once again. Of the display apparatus compatible with various input signals, some meet the power-saving standards such as DPMS for signals from personal computers while the others do not. Additionally, no power-saving standards are currently provided for television signals and it is not possible for display apparatus to effectively meet the requirement of power-saving by a single operation such as turning off the light source lamp.

SUMMARY OF THE INVENTION

Therefore, a first object of the present invention is to provide a display apparatus with which a plurality of power-saving operations can selectively be used according to the input image signal.

A second object of the present invention is to provide a display apparatus make adapted to a power-saving operation that can be used when there is no incoming image signal and also when the input image signal has a frequency out of the frequency range with which the apparatus is adapted to display images.

A third object of the present invention is to provide a display apparatus that can selectively be driven in a plurality of power-saving modes depending on the resolution of the input image signal.

A fourth object of the present invention is to provide a display apparatus having a plurality of image input terminals to be selectively used in corresponding respective power-saving modes.

According to the invention, the above objects of the invention are achieved by providing a display apparatus comprising a CPU, an image display device, a light source for irradiating the image display device, a circuit for turning on/off the light source, a means for determining the resolution of the input image signal, a first switching means for turning on/off the power supply to the circuit components except the light source turning on/off circuit and a second switching means for turning on/off the power supply to the light source turning on/off circuit and adapted to operate in a first power-saving mode for opening the circuits by means of the first switching means after an appropriately selectable first predetermined period of time and also open the circuits by means of the second switching means after an appropriately selectable second predetermined period of time or in a second power-saving mode for opening the first and second switching means by a combination of the polarity of the input horizontal synchronizing signal and that of the input vertical synchronizing signal, the first power-saving mode and the second power-saving mode being able to be selectively used.

Preferably, the first power-saving mode is used when the absence of image signal is detected and when the input image signal has a frequency out of the frequency range with which the apparatus is adapted to display images.

Preferably, the first power-saving mode or the second power-saving mode can be selectively used for a plurality of input image signals with different resolutions.

Still preferably, a display apparatus according to the invention comprises a plurality of image signal input terminals and the first power-saving mode or the second power-saving mode can be selectively used for each of the input terminals.

With a display apparatus according to the invention, all the circuits except the CPU and the light source turning on/off circuit are opened by means of the first switching means after an appropriately selectable first predetermined period of time the light source turning on/off circuit is opened by means of the second switching means after an appropriately selectable second predetermined period of time when the first power-saving mode is selected, whereas the first and second switching means are opened by a combination of the polarity of the input horizontal synchronizing signal and that of the input vertical synchronizing signal when the second power-saving mode is selected.

DETAILED DESCRIPTION OF THE PREFERRED EMBODIMENTS

Now, the present invention will be described in greater detail by referring to the accompanying drawings that illustrate preferred embodiments of the invention.

Figure 1:
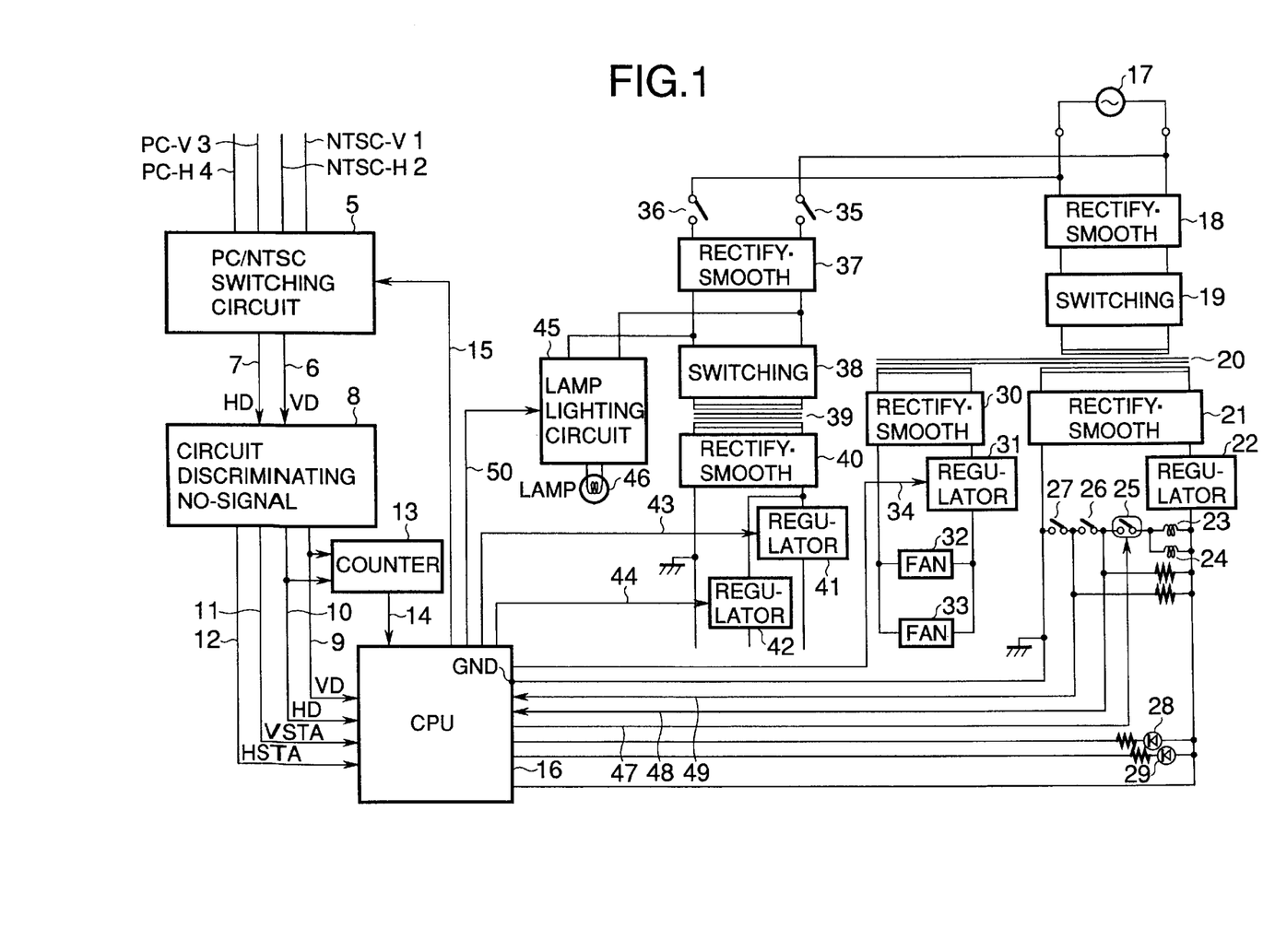
FIG. 1 is a schematic block diagram of an embodiment of the invention.

FIG. 1 is a schematic block diagram of an embodiment of display apparatus according to the invention and comprising an image display device adapted to selectively display image signals with different resolutions including image signals from personal computers (hereinafter referred to as PC signals) and NTSC television signals (hereinafter referred to as TV signals).

Referring to FIG. 1, there are shown a synchronization switching circuit 5 for selecting either PC synchronizing signals or NTSC synchronizing signals, a switching control circuit 15 operated by CPU 16, an NTSC vertical synchronizing signal 1, an NTSC horizontal synchronizing signal 2, a PC vertical synchronizing signal 3, a PC horizontal synchronizing signal 4, a horizontal synchronizing signal 6 and a vertical synchronizing signal 7 selected by the synchronization switching circuit 5 and an absence of signal determining circuit 8 for determining if there are no horizontal synchronizing signal 6 nor vertical synchronizing signal 7 and also if the input image signal has a frequency out of the frequency range with which the image display device is adapted to display images (hereinafter referred to signal absence). The signal absence circuit 8 also determines the polarity of each synchronizing signal.

There are also shown in FIG. 1 a horizontal synchronizing signal 9 and a vertical synchronizing signal from the signal absence determining circuit and a presence of horizontal synchronizing signal determining signal 11 for determining the presence or absence of a horizontal synchronizing signal and a presence of vertical synchronizing signal determining signal 12 for determining the presence or absence of a vertical synchronizing signal. Each of the signals is held to level "H" when the presence of a synchronizing signal is determined and to level "L" when the absence of a synchronizing signal is determined.

Figure 5:
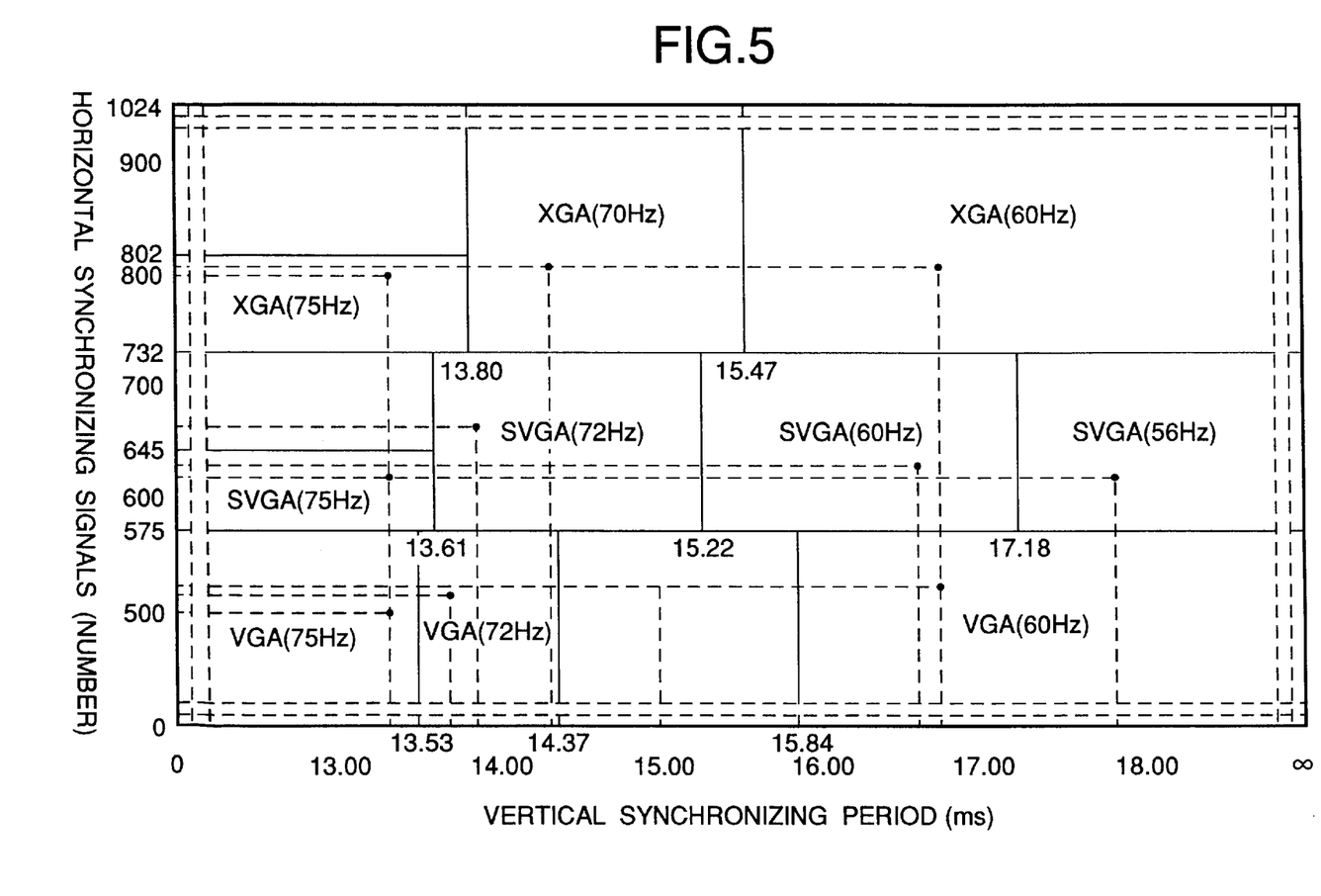
FIG. 5 is a resolution determining table that can be used for the embodiment.

Reference numeral 13 in FIG. 1 denotes a counter circuit for counting the number of horizontal synchronizing signals 10 within a vertical synchronizing period of a vertical synchronizing signal 9. The count obtained by the counter circuit 13 is fed to the CPU 16 by way of signal line 14. The signals 9, 10, 11 and 12 are also sent to the CPU 16. The CPU 16 then determines the current resolution on the basis of the number of horizontal synchronizing signals counted in a vertical synchronizing period by referring to a table as shown in FIG. 5. The table of FIG. 5 shows the relationship between the vertical synchronizing period (ms) represented by the horizontal axis and the number of horizontal synchronizing signals (frequency) represented by the vertical axis. The resolution of each image is rated as VGA, SVGA or XGA, each of which is divided into a plurality of levels. For example, a resolution rated as SVGA may be on the level or 75 Hz, 72 Hz, 60 Hz or 56 Hz so that, if the number of horizontal synchronizing signals (frequency) is determined to be 530, 630 or 800 as a whole, the resolution can be approximately determined from vertical and horizontal synchronizing signals.

Reference numeral 17 in FIG. 1 denotes a commercial power supply system and reference numerals 18 and 37 respectively denote a rectifier circuit and a smoothing circuit on the primary side. Reference numerals 19 and 38 denote switching circuits for DC—DC converters and reference numerals 20 and 39 denote transformers for producing predetermined voltages for the respective ACs produced by the respective switching circuits 19 and 38 as they come from the power supply system, whereas reference numerals 21, 30 and 40 denote rectifying/smoothing circuits for rectifying and smoothing the secondary side outputs of the transformers 20 and 39 respectively and reference numerals 22, 31, 41 and 42 denote constant voltage generating circuits (hereinafter referred to as regulators) for regulating the DC voltages obtained by the rectifying/smoothing circuits 21, 30 and 40 to show a constant voltage level. The regulator 22 operates as power source for the CPU 16 and constantly outputs a constant voltage regardless of the current power-saving mode.

The regulator 31 is used to produce power for a cooling fan and regulators 41 and 42 are used to produce a DC voltage to be used by a drive circuit (not shown) for driving the image display device, by an image processing circuit for the image signals to be displayed and by other circuits. Reference numerals 23 and 24 denote relay coils for controlling the opening and closing of relay contacts 35 and 36. Reference numeral 25 denotes an electronic switch controlled by control signals from the CPU 16 in order to open and close the relay contacts 35 and 36. Reference numeral 47 denotes a switching control line to be used for controlling the electronic switch. It is connected to the CPU 16.

The relay coils 23 and 24 are connected to the electronic switch 25 that is controlled by control signals from the CPU 16 and also to a manual main power switch 26 and a mechanical detection switch 27 in series so that the relay switches 35 and 36 are closed only when all the switches 25, 26 and 27 are closed to supply power to the lamp turning on/off circuit 45 in order to turn on the light source lamp 46 connected to the rectifying/smoothing circuit 37 and also apply an input voltage to the regulators 41 and 42 by way of the switching circuit 38. Reference numerals 43 and 44 denote control signals from the CPU 16 for controlling the regulators 41 and 42 and prohibiting or permitting their power outputs respectively.

The regulator 31 produces a supply voltage for fans 32 and 33 for cooling the lamp and the liquid crystal panel/circuit of the apparatus under the control of control signal 34 from the CPU 16 so that the supply voltage may remain independent of any other supply voltages of the apparatus and the fans 32 and 33 can go on cooling the lamp after the latter is turned off. Additionally, the mode of driving the fans 32 and 33 may be selected so that they may cool the lamp after the latter is turned on or, conversely, they may be driven to operate before the lamp is turned on depending on the type of the light source lamp 46. The detection switch 27 is a replacement detection switch for detecting the replacement of the light source lamp 46, although it may be used to detect the replacement of the cabinet. The detection switch 37 may be turned on/off mechanically or, alternatively, automatically according to the signal of a sensor for detecting the replacement of the lamp. Current status determining signals 48 and 49 for the manual main power switch 26 and the detection switch 27 are sent to the CPU 16, which determines the current status of the switches by referring to Table 1 and issues a control signal 47 to the electronic switch 25.

TABLE 1

| Signal Lines of FIG. 1 | Status of current status determining signal 48 and 49 | | | |
|---|---|---|---|---|
| 48 | H | H | L | L |
| 49 | H | L | H | L |
|  | Detection switch off | Main power switch off | Abnormal | Main power switch off Detection switch off |

According to Table 1, an abnormal condition is detected when the signal line 48 of FIG. 1 is at level "L" and the signal line 49 of FIG. 1 is at level "H" and both the main power switch 26 and the detection switch 27 are on and the relay switches 35 and 36 are also on when the signal lines 48 and 49 are both at level "L". The status of each of the switches 26 and 27 are detected by the CPU 16 by a periodical scanning operation of the latter.

Reference numerals 28 and 29 denote status display LEDs, of which the LED 28 displays a first power-saving mode and the LED 29 displays a second power-saving mode. Reference numeral 46 denotes a light source lamp for the light source of the image display device that is used as light source for the illumination from the back of a transmission type liquid crystal panel, when such a panel is used, or as light source for illuminating the liquid crystal panel from the front side and projecting the reflected image on the projection screen by way of a projection lens, when a reflection type liquid crystal panel is used.

The absence of signal determining circuit 8 is used for determining the presence or absence of a synchronizing signal. When there is no incoming image signal and also when the input image signal has a frequency out of the frequency range with which the apparatus is adapted to display images, or when the absence of signal is detected in short, the CPU 16 moves into the first power-saving mode after a first predetermined period of time that can be selected arbitrarily by the user on the selection menu (not shown) displayed on the screen, which may include the selection of the type of image signal, by prohibiting the outputs of the regulators 41 and 42 by means of control signals 43 and 44 respectively. Under this condition, the CPU 16 turns on the LED 28 to indicate that the first power-saving mode has been selected.

The CPU 16 can also open the relay switches 35 and 36 by inverting the control signal on the switching control line for turning on/off the electronic switch after a second predetermined period of time that can be selected arbitrarily by the user on the selection menu. Then, the supply of power to the light source lamp, the lamp turning on/off circuit 45 and the switching circuit 38 and also to the switching circuit 38, the transformer 39, the rectifying/smoothing circuit 40 and the regulators 41 and 42 is suspended for the second power-saving mode. Under this condition, the CPU 16 turns on the LED 29 to indicate that the second power-saving mode has been selected.

It will be understood that the CPU 16 constantly performs the operation of determining the resolution by means of horizontal and vertical synchronizing signals 9 and 10 if the absence of signal is detected. It also monitors the operation of the keys (not shown) to be used by the user to select an input terminal and the status of the presence of horizontal synchronizing signal determining signal 11 and the presence of vertical synchronizing signal determining signal 12.

If any change is observed in the status of the horizontal synchronizing signal 9, the vertical synchronizing signal 10, the presence of horizontal synchronizing signal determining signal 11 and the presence of vertical synchronizing signal determining signal 12 within the first or second predetermined period of time or the user operated a key, the CPU 16 moves into the normal operation mode when the change or the key operation is in the first predetermined period of time and turns off the LEDs 28 and 29 and brings the control signals 43 and 44 to level "H" in order to feed the circuits with the outputs of the regulators 41 and 42 and moves into the normal operation mode when the change or the key operation is in the second predetermined period of time.

If any change is observed in the status of the horizontal synchronizing signal 9 and the vertical synchronizing signal 10 or the user operated a key, the CPU 16 moves into the normal operation mode by bringing the switching control line 47 to be used for a control signal for turning on/off the electronic to level "H" to close the relays 35 and 36 and feed power to the lamp turning on/off circuit 45 and subsequently bringing the control signals 43 and 44 to level "H" and turning off the LED 29 at the same time.

Figure 2:
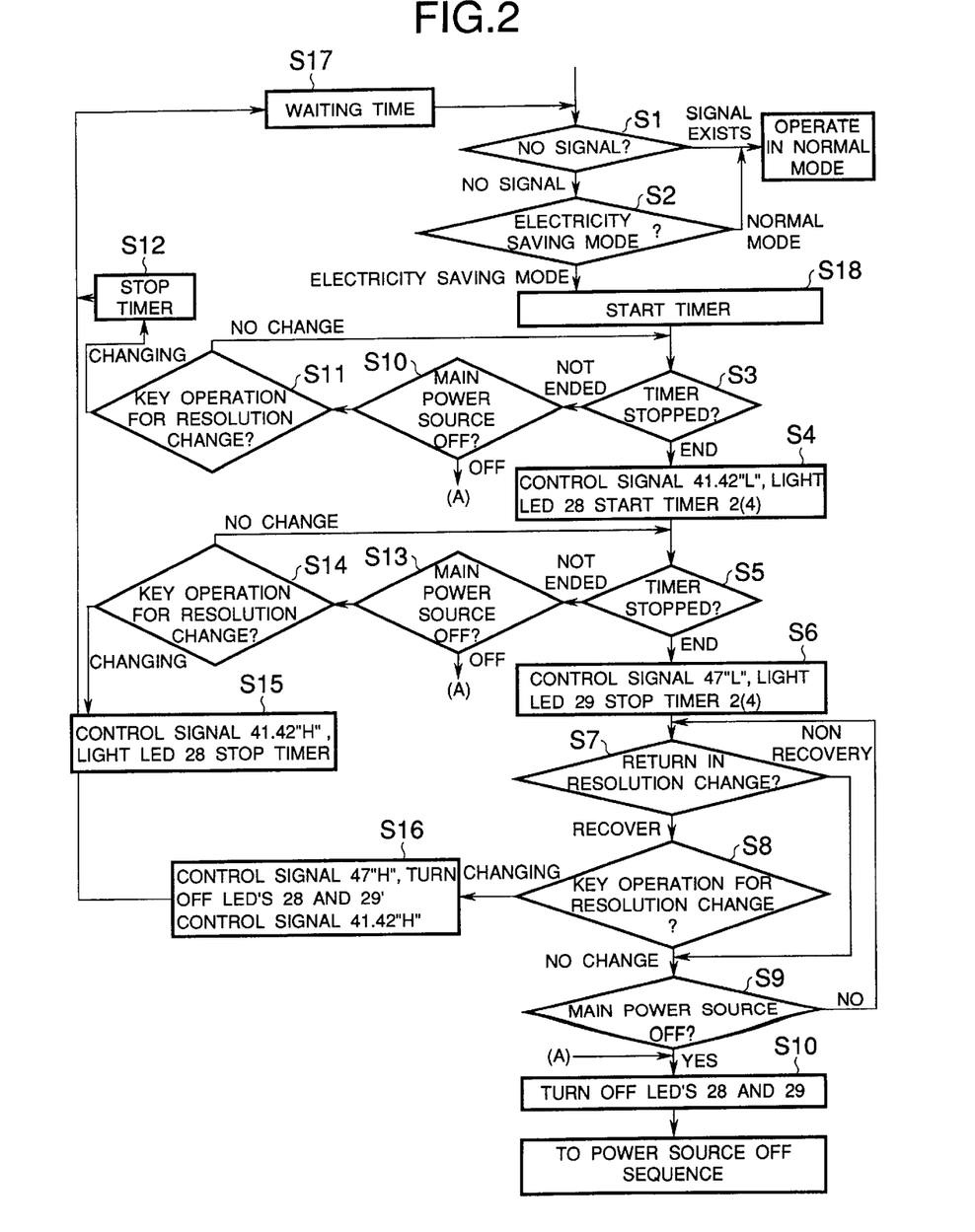
FIG. 2 is a flow chart for the operation of the embodiment in a first power-saving mode.

If there is no incoming image signal or the input image signal has a frequency out of the frequency range with which the apparatus is adapted to display images and the user selected a mode of not moving into the power-saving mode on the menu, no power-saving procedure of S2 of the flow chart of FIG. 2 will be followed.

In the second power-saving mode, the user can select a mode of not returning from the power-saving mode by operating a key on the menu and according to a change in the resolution. If such is the case, the procedure of S7 of the flow chart is followed so that the procedure of responding to a key operation of the user and that of monitoring any change in the resolution will not be followed. Then, the normal operation mode will be restored if the main power switch 26 remains on.

If the mode of returning from the power-saving mode in the second power-saving period of time, the CPU 16 monitors any key operation of the user and any change in the resolution in the image signal and moves to the normal operation mode by following the procedures of S8 and S9 of FIG. 9 once a change is detected.

Figure 3:
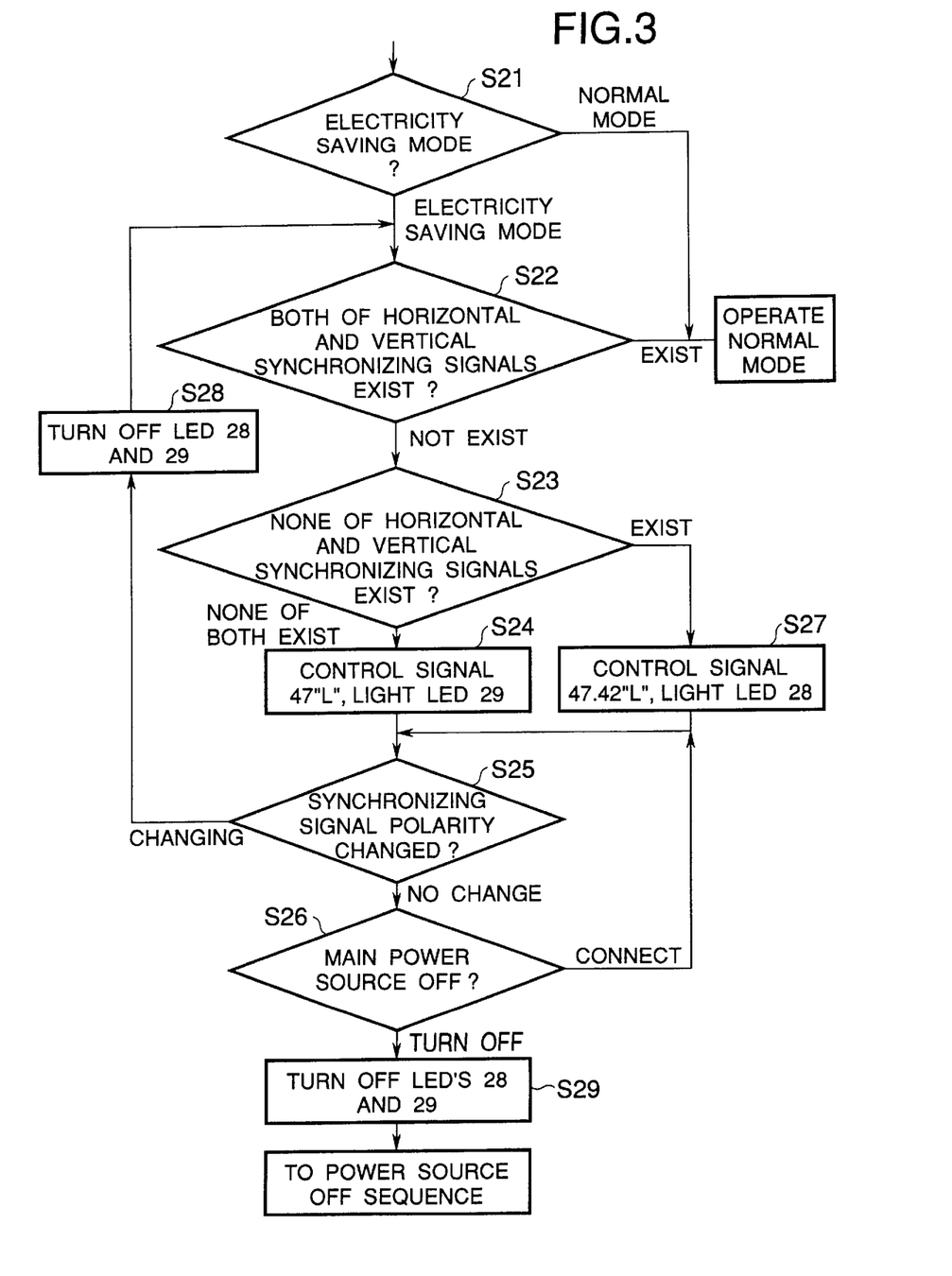
FIG. 3 is a flow chart for the operation of the embodiment in a second power-saving mode.

FIGS. 2 and 3 shows the procedure of selecting the power-saving mode for different grades of resolution (observable, in this embodiment, when an NTSC image signal is input or when a PC image signal is input) in response to an input image signal within a frequency range with which the apparatus is adapted to display images.

Referring to FIG. 2, firstly, either the NTSC signal or the PC signal and the power-saving mode are selected on the menu. Then, either the presence or absence of signals is determined by means of the absence of signal determining circuit 8 (S1) and the normal operation mode is restored if the presence of signals is determined.

If, on the other hand, the absence of signals is determined in the above step, it is then determined if the power-saving mode is selected or not (S2). If the power-saving mode is not selected, the operation follows the procedure same as the one to be followed when the presence of signals is detected. If the power-saving mode is specified, a counting process is started for the first predetermined period of time (S18). Then, it is determined if the first predetermined period of time has elapsed or not (S3). If not, it is then determined if the main power switch 26 is turned off or not (S10) and then if the resolution has been changed or not or the key has been operated or not (S11). If the resolution has not been changed or the key has not been operated, the operation is determined to be in a stand-by status returns to S3. If, on the other hand, it is determined that the resolution has been changed or the key has been operated, the counting process for the first predetermined period of time is suspended (S12) and the operation returns to S1 after waiting for the elapse of a predetermined period of time (S17).

If it is found that the first predetermined period of time is over in S3, the control signals 43 and 44 are brought to level "L" to turn off the regulators 41 and 42 and move into the first power-saving mode, where the LED 28 is turned on and a counting process is started for the second predetermined period of time (S4).

Then, it is determined if the second predetermined period of time has elapsed or not (S5). If not, it is then determined if the main power switch 26 is turned off or not (S13) and then if the resolution has been changed or not or the key has been operated or not (S14). If the resolution has not been changed or the key has not been operated, the operation is determined to be in a stand-by status returns to S5. If, on the other hand, it is determined that the resolution has been changed or the key has been operated, the control signals 43 and 44 are brought to level "H" to turn off the LED 28 and the counting process for the first predetermined period of time is terminated (S15) and the operation returns to S1 after waiting for the elapse of a predetermined period of time (S17).

If it is determined in S5 that the second predetermined period of time has elapsed, the control signal 47 is brought to level "L" to move into the second power-saving mode, when the LED 29 is turned on and the counting process for the second predetermined period of time is suspended (S6). Then, it is determined if the normal operation mode is restored by a change in the resolution or not (S7). If restoration of the normal operation mode is specified, it is determined if the resolution has been changed or not or the key has been operated or not (S18). If the resolution has been changed or the key has been operated, the control signal 47 is brought to level "H" to suspend the power-saving mode and turn off the LEDs 28 and 29 and the control signals 43 and 44 are brought to level "H" (S16). Then, the operation returns to S1 after waiting for the elapse of a predetermined period of time (S17).

If restoration of the normal operation mode is not specified and it is determined in S8 that the resolution has not been changed or the key has not been operated, then it is determined if the main power switch is turned off or not (S9). If not, the operation moves to S7, to restore the normal operation mode. If the main power switch 26is turned off in S10, S13 or S9, the LEDs 28 and 29 are turned off and hence the power supply to the display apparatus is turned off.

In this way, the CPU 16 determines which of the NTSC image signal and the PC image signal is selected by the key operation of the user. If the PC image signal is selected and the PC conforms to a set of power-saving standards such as DPMS, the presence or absence of a horizontal synchronizing signal and that of a vertical synchronizing signal will change depending the selected power-saving level in a manner as shown in Table 2 below.

TABLE 2

| Mode | Control signal | | | Power-saving level | Restor. time | As DPMS standards |
| --- | --- | --- | --- | --- | --- | --- |
|  | Horizontal sync | Vertical sync | Video signal |  |  |  |
| Normal state | yes | yes | yes | — |  | indispensable |
| Stand-by | no | yes | no | low | shortest | optional |
| Suspend | yes | no | no | high | long | indispensable |
| Off | no | no | no | highest | depend on systems | indispensable |

Therefore, if either the first power-saving mode or the second power-saving mode is selected or not is determined by signal 11 and 12 on the absence of signal determining circuit 8 and the procedure of the flow chart of FIG. 3 is followed to move to the first power-saving mode in the stand-by mode or the suspend mode of Table 2 or to the second power-saving in the off mode in Table 2 above (see S22, S23, S24, S27 in FIG. 3).

Now, the operation will be described further by referring to the flow chart of FIG. 3. Firstly, it is determined if either the first or the second power-saving mode is selected or not (S21). If either the first power-saving mode or the second power-saving mode is selected, it is then determined that if both a horizontal synchronizing signal and a vertical synchronizing present or not (S22). If both signals are detected, the display operation will be conducted in the normal operation mode. If neither a horizontal synchronizing signal nor a vertical synchronizing signal is detected, the control signal 47 is brought to level "L" to turn off the electronic switch 25 and turn off the LED 29 in order to indicate that the second power-saving mode is now in effect. If it is found in step S23 that both a horizontal synchronizing signal and a vertical synchronizing signal exist, then the control signals 43 and 44 are brought to level "L" to turn off the regulators 41 and 42 and turn on the LED 28 in order to indicate that the first power-saving mode has been selected. Then, it is detected if the polarity of the synchronizing signals has been changed or not (S25). If it is found that the polarity of the synchronizing signals has been changed, the LEDs 28 and 29 are turned off to make the current power-saving mode ineffective and the operation moves to step S22. If, on the other hand, it is found in step S25 that the polarity of the synchronizing signals has not been changed, it is detected if the main power switch 26 has been operated and turned off (S26). If it is found that the main power switch has not been operated, the operation moves to step S25. If, on the other hand, it is found that the main power switch has not been operated, the LEDs 28 and 29 are turned off (S29) to turn off the main power switch.

A power-saving mode will be selected in the case where the NTSC signal is selected, where no image signal is present as illustrated in FIG. 2 or where the input image signal has a frequency out of the frequency range with which the apparatus is adapted to display images. Note that the predetermined periods of time as timed in S3 and S4 can be selected within a selectable range independently from the first and second predetermined periods of time although they correspond to the first and second predetermined periods of time respectively. Additionally, a power-saving mode may be selected and canceled for the NTSC image signal and for the PC image signal independently and the power-saving mode will be bypassed when the normal operation mode is selected (so that the normal operation mode is resumed from S2 of the flow chart of FIG. 2 and from S21 of the flow chart of FIG. 3).

Figure 4:
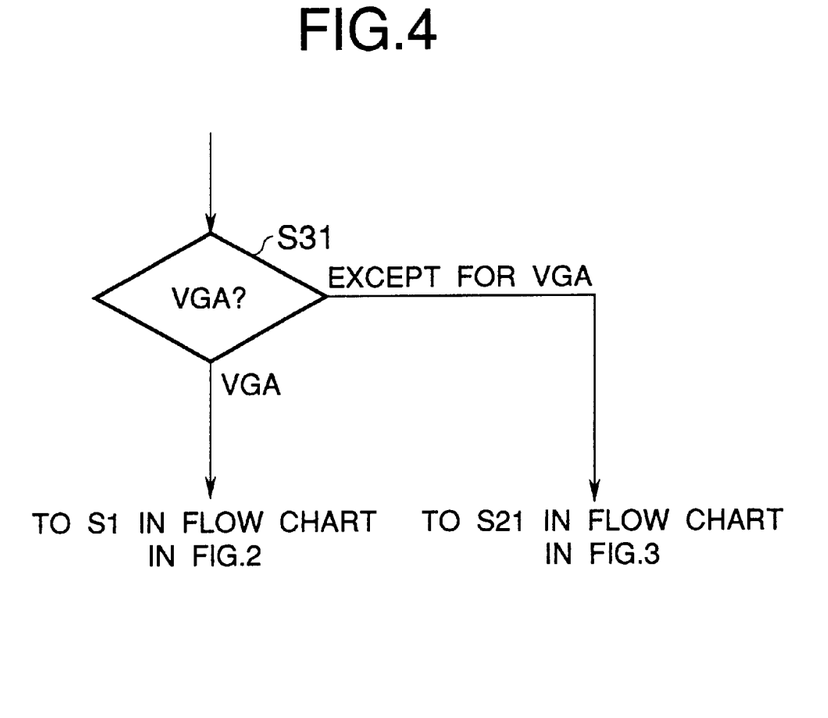
FIG. 4 is a flow chart for the operation of switching the power-saving mode according to the resolution for the embodiment.

Assuming that the PC image signal is selected, shown in FIG. 4, if the procedure for determining the current resolution agree with the preselected resolution (VGA in this embodiment) or not is selected on the menu of the screen, the operation moves to step S1 of the flow chart of FIG. 2 to select the power-saving mode of FIG. 2 when the current resolution agree with VGA and to step S21 of FIG. 3 to select the power-saving mode of FIG. 3 when the current resolution does not agree with VGA. In this way, a power-saving mode can be selected for each feasible grade of resolution.

Thus, as described above, a plurality of different power-saving modes may be arranged to make the apparatus optimally adapted to different modes of operations. Particularly, the first and second power-saving modes may be used to save power optimally depending on the polarity of the current image signal and the rating of the current resolution such as VGA and SVGA.

Figure 6:
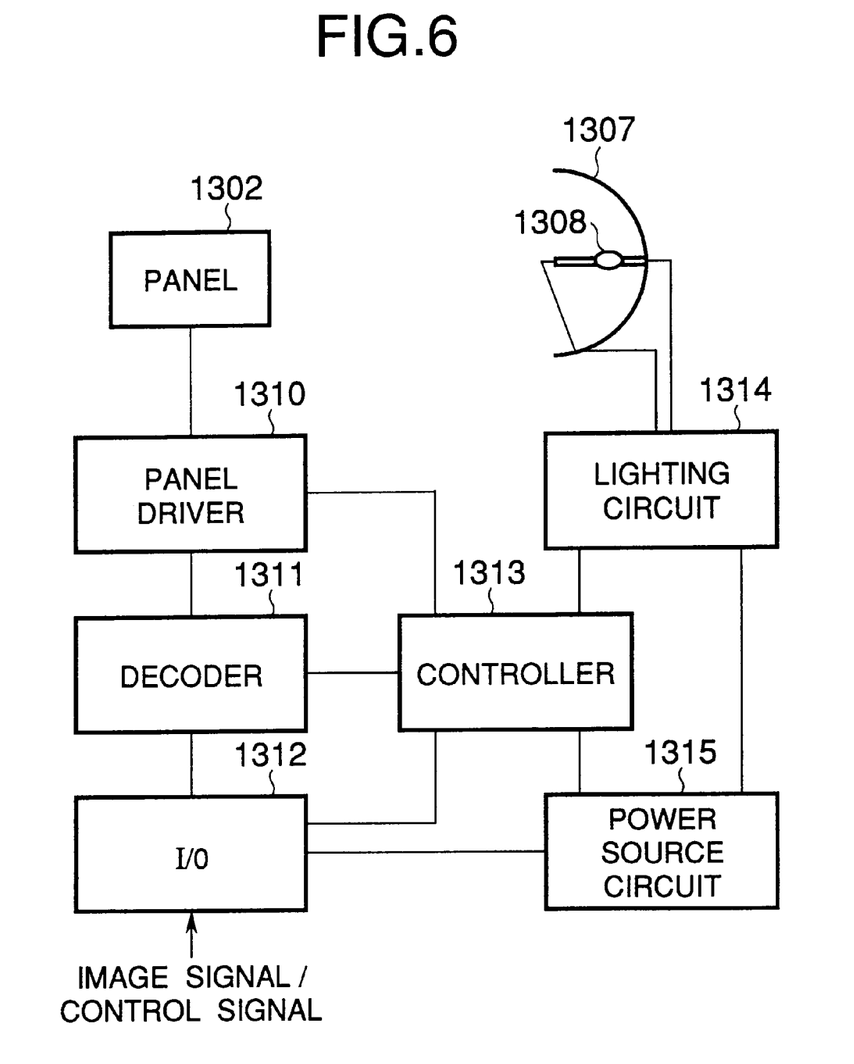
FIG. 6 is a schematic block diagram of another embodiment of the invention.

FIG. 6 is a schematic block diagram of the drive circuit of a projection type liquid crystal display apparatus according to the invention. In FIG. 6, reference numeral 1310 denotes a panel driver for inverting the polarity of RGB image signals and producing a liquid crystal drive signal having a predetermined voltage amplitude, a drive signal for driving the counter electrode 1324 of the apparatus and various timing signals. Reference numeral 1312 in FIG. 6 denotes an interface for decoding various image signals and control transmission signals into standard image signals.

Reference numeral 1311 in FIG. 6 denotes a decoder for decoding the standard image signals from the interface 1312 and transforming them into images signals of the three primary colors of R, G and B and synchronizing signals adapted to the liquid crystal panel 1302. Reference numeral 1314 denotes a ballast for driving and lighting the light source lamp 1308 located inside an elliptic reflector 1307, which is an arc lamp. Reference numeral 1315 is a power supply circuit for supplying the circuit blocks with power. Reference numeral 1313 denotes a controller containing a control unit (not shown) in it and controlling the operation of each of the circuit blocks in a coordinated manner. Thus, it will be seen that the drive circuit system of this projection type liquid crystal display apparatus is a system popularly used for a single panel type projector and hence the display apparatus can display high quality images free from the mosaic of RGB without applying any heavy load on the drive circuit system.

With a projection type liquid crystal display apparatus having a configuration as described above, the power-saving switch of the power supply circuit 1315 is operated in the first power-saving mode to suspend the supply of power to the I/O interface 1312, the decoder 1311, the panel driver 1310 and the liquid crystal panel 1302 according to the command from the controller 1313 within the CPU. In the second power-saving mode, on the other hand, both the lamp lighting circuit 1314 and the power source lamp 1308 are turned off and the supply of power to the switching circuit (not shown) of the power supply circuit 1315, the rectifying/smoothing circuit and the regulators is suspended. In this way, the display apparatus is driven in a manner adapted to optimally and most efficiently save power.

ADVANTAGES OF THE INVENTION

As described in detail above, with a display apparatus according to the invention, the second power-saving mode is selected when the input of the display apparatus comes from a personal computer adapted to issue a power-saving control signal depending on the polarity of synchronizing signals whereas the first power-saving mode is selected when the input of the apparatus is a television signal not provided with a power-saving control signal so that the apparatus is operated in a power-saving fashion for either signal. Additionally, the first power-saving mode will be selected to reduce the power consumption rate of the apparatus when the absence of signal is detected or the detected image signal has a frequency out of the frequency range with which the apparatus is adapted to display images.

Still additionally, when a television signal for 640 horizontal pixels and 480 vertical pixels obtained by scanning line conversion and a computer signal for 1,024 horizontal pixels and 768 vertical pixels coming from a personal computer adapted to issue a power-saving control signal are selectively applied to a display apparatus according to the invention by means of an external signal switcher, the first power-saving mode will be selected for the former signal whereas the second power-saving mode will be selected for the latter signal by detecting the resolution of each of the signals so that the display apparatus can operate in a power-saving fashion for either signal.

Finally, if a display apparatus according to the invention is provided with a plurality of input terminals and television signals and personal computer signals are applied to the apparatus in a mixed state, the apparatus can operate in a power-saving fashion for any of the signals by selecting either the first power-saving mode or the second power-saving mode at each of the input terminals.

What is claimed is:

1. A display apparatus comprising a CPU, an image display device, a light source for irradiating the image display device, a circuit for turning on/off the light source, a means for determining the resolution of the input image signal, a first switching means for turning on/off the power supply to the circuit components except the light source turning on/off circuit and a second switching means for turning on/off the power supply to the light source turning on/off circuit and adapted to operate in a first power-saving mode for opening the circuits by means of said first switching means after an appropriately selectable first predetermined period of time and also open the circuits by means of said second switching means after an appropriately selectable second predetermined period of time or in a second power-saving mode for opening said first and second switching means by a combination of the polarity of the input horizontal synchronizing signal and that of the input vertical synchronizing signal, said first power-saving mode and said second power-saving mode being able to be selectively used.

2. A display apparatus according to claim 1, wherein the first power-saving mode is used when the absence of image signal is detected and when the input image signal has a frequency out of the frequency range with which the apparatus is adapted to display images.

3. A display apparatus according to claim 1, wherein said first power-saving mode or said second power-saving mode can be selectively used for a plurality of input image signals with different resolutions.

4. A display apparatus according to claim 1, wherein it comprises a plurality of image signal input terminals and said first power-saving mode or said second power-saving mode can be selectively used for each of the input terminals.

5. A display apparatus according to any of claims 1 through 4, wherein the resolution of said input image signal is determined by counting horizontal synchronizing signals within a period of a vertical synchronizing signal of said input image signal.

6. A display apparatus according to any of claims 1 through 4, wherein the light source lamp driven by said light source lamp turning on/off circuit is used as light source of the liquid crystal panel.

* * * * *

UNITED STATES PATENT AND TRADEMARK OFFICE
CERTIFICATE OF CORRECTION

PATENT NO.    : 6,184,875 B1
DATED         : February 6, 2001
INVENTOR(S)   : Makoto Matsuura It is certified that error appears in the above-identified patent and that said Letters Patent is hereby corrected as shown below:

Column 1,
Line 16, "cam coders," should read -- camcoders, --.

Column 6,
Line 37, "procedure same" should read -- same procedure --.

Column 7,
Line 28, "26is" should read -- 26 is --; and
Line 56, "signal" should read -- signals --.

Column 10,
Line 35, "image" should read -- an image --; and
Line 54, "light source of" should read -- a light source for --.

Signed and Sealed this

Eighteenth Day of October, 2005

JON W. DUDAS
*Director of the United States Patent and Trademark Office*